US007885794B2

(12) United States Patent
Liu et al.

(10) Patent No.: US 7,885,794 B2
(45) Date of Patent: Feb. 8, 2011

(54) OBJECT COMPARISON, RETRIEVAL, AND CATEGORIZATION METHODS AND APPARATUSES

(75) Inventors: Yan Liu, Grenoble (FR); Florent Perronnin, Domene (FR)

(73) Assignee: Xerox Corporation, Norwalk, CT (US)

(\*) Notice: Subject to any disclaimer, the term of this patent is extended or adjusted under 35 U.S.C. 154(b) by 537 days.

(21) Appl. No.: 11/947,859

(22) Filed: Nov. 30, 2007

(65) Prior Publication Data

US 2009/0144033 A1 Jun. 4, 2009

(51) Int. Cl.
*G06F 17/50* (2006.01)
*G06K 9/62* (2006.01)
*G06F 17/30* (2006.01)

(52) U.S. Cl. .................... 703/2; 703/6; 382/159; 382/225; 382/228

(58) Field of Classification Search .............. 703/2, 703/6; 382/225, 228, 159; 706/20
See application file for complete search history.

(56) References Cited

U.S. PATENT DOCUMENTS

| | | | |
|---|---|---|---|
| 7,274,832 B2 * | 9/2007 | Nicponski | 382/297 |
| 2003/0147558 A1 * | 8/2003 | Loui et al. | 382/225 |
| 2005/0105805 A1 * | 5/2005 | Nicponski | 382/216 |
| 2006/0018516 A1 * | 1/2006 | Masoud et al. | 382/115 |
| 2007/0005356 A1 | 1/2007 | Perronnin | |

FOREIGN PATENT DOCUMENTS

EP    1 739 593    1/2007

OTHER PUBLICATIONS

Goldberger et al., "An Efficient Image Similarity Measure Based on Approximations of KL-Divergence Between Two Gaussian Mixtures," Proceedings of the Eight IEEE International Conference on Computer Vision (ICCV), vol. 1, Oct. 13, 2003.
A. Srivastave et al., "Universal Analytical Forms for Modeling Image Probabilities," IEEE Transactions on Pattern Analysis and Machine Intelligence, vol. 24, No. 9, Sep. 1, 2002.
A.S. Willsky, "Multiresolution Markov Models for Signal and Image Processing," Proceedings of the IEEE, vol. 90, No. 8, Aug. 1, 2002.
N. Yamane et al., "Optimal Noise Removal Using an Adaptive Wiener Filter Based on a Locally Stationary Gaussian Mixture Distribution Model for Images," Electronics and Communications in Japan, Part 3, vol. 87, No. 1, Jan. 1, 2004.
X. Song et al., "Key-Frame Extraction for Object-Based Video Segmentation," Acoustics, Speech, and Signal Processing (ICASSP '05), IEEE, vol. 2, Mar. 18, 2005.

(Continued)

*Primary Examiner*—Thai Phan
(74) *Attorney, Agent, or Firm*—Fay Sharpe LLP

(57) ABSTRACT

Object comparison is disclosed, including: adapting N universal mixture model components to a first object to generate N corresponding first object mixture model components, where N is an integer greater than or equal to two; and generating a similarity measure based on component-by-component comparison of the N first object mixture model components with corresponding N second object mixture model components obtained by adaptation of the N universal mixture model components to a second object.

25 Claims, 3 Drawing Sheets

OTHER PUBLICATIONS

U.S. Appl. No. 11/418,949, filed May 5, 2006, Perronnin.
U.S. Appl. No. 11/524,100, filed Sep. 19, 2006, Perronnin.
Chan et al., "A family of Probabilistic Kernels Based on Information Divergence," Technical Report SVCL-TR-2004-01, Jun. 2004.
Dempster et al., "Maximum Likelihood from Incomplete Data via the EM Algorithm," Journal of the Royal Statistical Society, vol. 39, No. 1, pp. 1-38, 1977.
Jebara et al., "Probability Product Kernels," Journal of Machine Learning Research 5, vol. 5, pp. 819-844, 2004.
Jebara et al., "Bhattacharyya and Expected Likelihood Kernels," Proc. of the $16^{th}$ Annual Conf. on Learning Theory and $7^{th}$ Kernel Workshop, 2003.
Gales, "Cluster Adaptive Training of Hidden Markov Models," Cambridge University, pp. 1-19, 1999.
Kondor et al., "A Kernel Between Sets of Vectors," International Conference on Machine Learning (ICML), Washinton DC, 2003.
Lyu, "A Kernel Between Unordered Sets of Data: The Gaussian Mixture Approach," European Conference on Machine Learning (ECML), Porto, Portugal, 2005.
Leggetter et al., "Flexible Speaker Adaptation Using Maximum Likelihood Linear Regression," Coomputer Speech and Language, 1995.
Moreno et al., "A Kullback-Leibler Divergence Based Kernel for SVM Classification in Multimedia Applications," NIPS, 2003.
Perronnin et al., "Fisher Kernels on Visual Vocabularies for Image Categorization," Int. Conf. on Computer Vision and Pattern Recognition (CVPR), 2007.
Vasconcelos et al., "The Kullback-Leibler Kernel as a Framework for Discriminant and Localized Representations for Visual Recognition," European Conference on computer Vision (ECCV), 2004.
Vasconcelos, "On the Efficient Evaluation of Probabilistic Similarity Functions for Image Retrieval," IEEE Trans. On PAMI, vol. 50, No. 7, Jul. 2004.
Zhang et al., "Local Features and Kernels for Classification of Texture and Object Categories: An In-Depth Study," Technical Report, INRIA, 2005.
Gauvain et al., "Maximum A Posteriori Estimation for Multivariate Gaussian Mixture Observations of Markov Chains," IEEE trans. On Speech and Audio Processing, 1994.
Goldberger et al., "An Efficient Image Similarity Measure Based on Approximations of KL-Divergence Between Two Gaussian Mixtures," Int. Conf. on computer Vision (ICCV), 2003.
Reynolds et al., "Speaker Verification Using Adapted Gaussian Mixture Models," Digital Signal Processing 10, pp. 19-41, 2000.

* cited by examiner

OBJECT COMPARISON, RETRIEVAL, AND CATEGORIZATION METHODS AND APPARATUSES

BACKGROUND

The following relates to the information processing arts. The following is described with illustrative reference to image retrieval and categorization applications, but will be useful in numerous other applications entailing comparison, retrieval, categorization, or the like of objects such as images, video content, audio content, and so forth.

In data processing, some useful operations include automatic or semi-automatic object categorization, or automated or semi-automated retrieval of similar objects. For example, given an unorganized database of images, it may be useful to sort or categorize the images into classes such as images of people, images of animals, images of plants, landscape images, or so forth. In a related application, given a particular image it may be useful to identify and retrieve similar images from the database of images.

It is known to model images using parameterized models. A Gaussian model, for example, characterizes an image using a single Gaussian distribution representative of low level image features and having a mean vector and covariance matrix parameters. Advantageously, characterizing the image by a single Gaussian component provides for straightforward comparison of different images, for example by comparing the mean vectors and covariance matrices of the two image models. However, a distribution having a single Gaussian component contains limited descriptive content and may be insufficient to adequately describe some (or even most) images.

The Gaussian model is an example of a single component model. Limitation to a single component raises substantial concerns about descriptive adequacy. In other approaches, a mixture model is employed to characterize an image. For example, a Gaussian mixture model (GMM) describes the low level features distribution for an image using a weighted combination of Gaussian components each having mean vector and covariance matrix parameters. Advantageously, a GMM or other mixture model provides a higher number of components by which to characterize the image.

However, use of mixture models introduces other difficulties. The higher dimensionality of the mixture model can make it difficult to robustly determine the model parameters for a given image. For example, a few hundred low level feature vectors may be extracted from a given image. Such a sparse data set may be insufficient to accurately estimate the relatively large number of mixture parameters. As a result, one may obtain the same quality of model "fit" for very different sets of mixture model parameters, making it difficult to ascertain the "correct" mixture model parameters.

Uncertainty in the model parameters determination carries over into the image comparison stage. For example, two images that are in reality quite similar may however be fitted with very different sets of mixture model parameters, due to sparseness of the feature vectors sets extracted from the images. In such a case, the computed distance between the mixture models for the two images will be large, and the images will erroneously be deemed to be quite different.

In addition to this robustness problem, the use of mixture models can make image comparison computationally intensive. For example, in some studies it has been estimated that a GMM having about 128 Gaussian components is preferable to sufficiently characterize an image. A comparison of two images will entail pairwise comparison of each set of Gaussian components, leading to about 16,000 Gaussian comparison operations for a GMM having 128 Gaussian components. Further, these approximately 16,000 Gaussian comparison operations are repeated for each pairwise image comparison involved in the classification or similar image retrieval task. Such extensive computations can be problematic or even prohibitive when operating on a large images database.

BRIEF DESCRIPTION

In some illustrative embodiments disclosed as illustrative examples herein, a object processing method is disclosed, comprising: adapting a universal mixture model including a plurality of universal mixture model components to a first object to generate a first object mixture model including a plurality of first object mixture model components having one to one correspondence with the plurality of universal mixture model components; performing component-by-component comparison of the plurality of first object mixture model components and a plurality of second object mixture model components obtained by adaptation of the universal mixture model to a second object and having one to one correspondence with the plurality of first object mixture model components; and generating a similarity measure for the first and second objects based on the component-by-component comparison.

In some illustrative embodiments disclosed as illustrative examples herein, a digital storage medium is disclosed storing digital instructions executable to perform a method comprising: adapting N universal mixture model components to a first object to generate N corresponding first object mixture model components, where N is an integer greater than or equal to two; and generating a similarity measure based on component-by-component comparison of the N first object mixture model components with corresponding N second object mixture model components obtained by adaptation of the N universal mixture model components to a second object.

In some illustrative embodiments disclosed as illustrative examples herein, an object processing apparatus is disclosed, comprising: a model adaptation engine configured to adapt a plurality of universal mixture model components to a first object to generate a corresponding plurality of first object mixture model components; and a component-by-component similarity estimator configured to generate a similarity measure quantifying similarity of the first object and a second object based on component-by-component comparison of the plurality of first object mixture model components and a plurality of second object mixture model components obtained by adaptation of the universal mixture model components to the second object.

DETAILED DESCRIPTION

Figure 1:
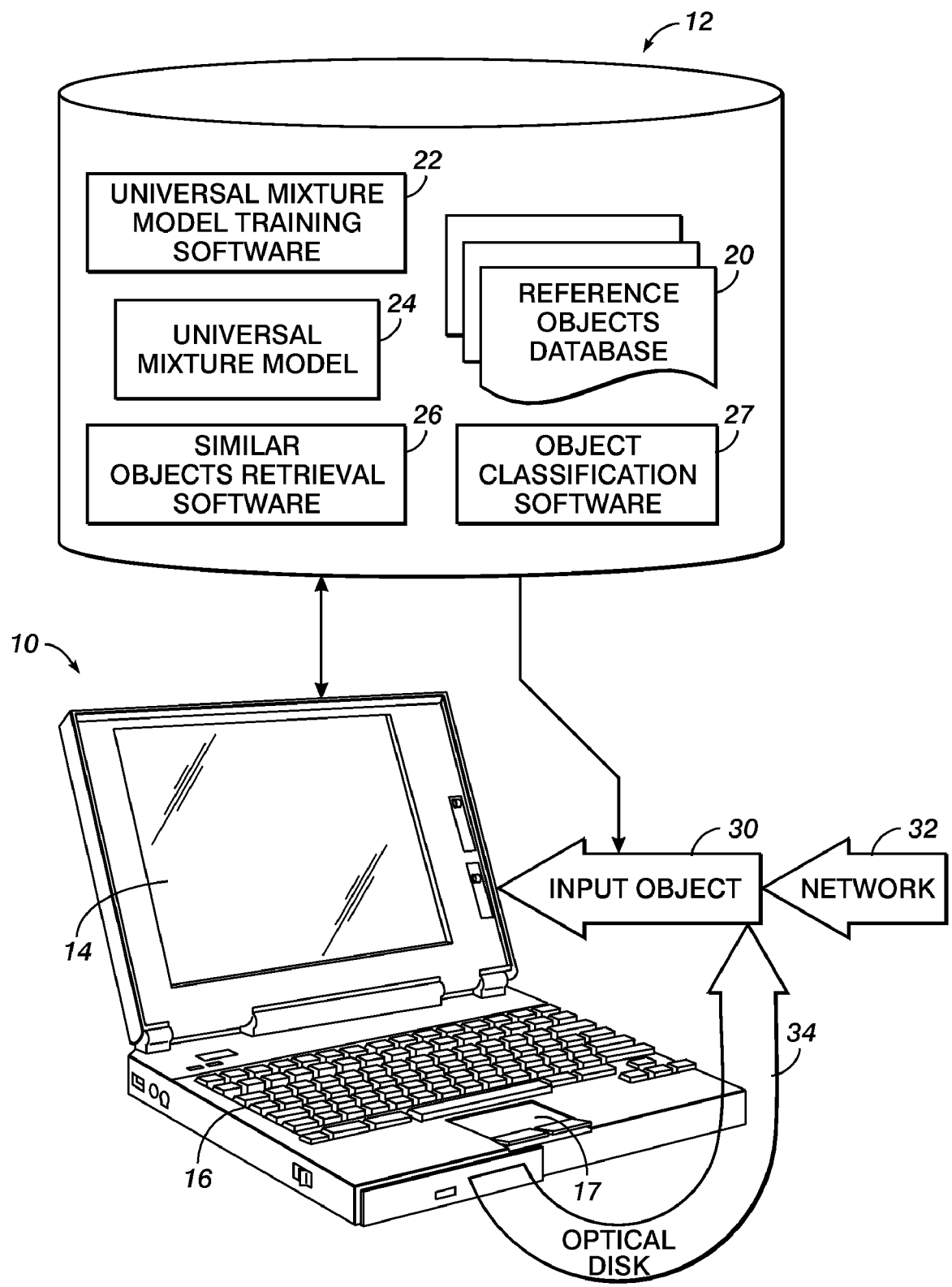
FIG. 1 diagrammatically shows an object processing apparatus.

In the following, images are sometimes used as illustrative objects. More generally, in any selected embodiment the objects may be any selected type of data collection, such as images, video files or snippets, audio files or snippets, graphical logo representations, vector graphics, text documents, multimedia documents, or so forth.

The approaches for object comparison disclosed herein employ models comprising mixtures of components configured such that the mixture is representative of an object. In the illustrative examples presented herein, the mixture models are of Gaussian mixture model (GMM) form and employ Gaussian distribution components. However, models comprising mixtures of other probabilistic or non-probabilistic component types are also contemplated, such as a mixture model of components of other distribution types, a mixture model comprising a set of vectors obtained through K-means clustering of low level feature vectors, or so forth. It is also contemplated for the components of the mixture to include components of different types, such as for example a mixture model including for example some Gaussian distribution components and some Laplace distribution components. Also, the mixture model may be over discrete or continuous variables.

The approaches for object comparison disclosed herein employ a universal mixture model that is derived from a suitably representative training set of objects. The universal mixture model can be derived using any suitable algorithm, such as maximum likelihood estimation. The model for an input object is obtained by adaptation of the universal model to comport with low level features of the input object. The adaptation process provides robust comparison because use is made of some a priori knowledge on the location of the parameters in the whole parameter space.

Further, because each object model is derived by adaptation of the universal model, there is a component-by-component or transitive correspondence between the mixture components of the universal model and the mixture components of each input object model. By transitivity, this means that there is a component-by-component correspondence between the mixture components of two object models. Because of this, comparison of objects is substantially simplified. Comparison of first and second objects entails comparing each mixture component of the adapted first object model with the corresponding mixture component of the adapted second object model. The component correspondence is known a priori—e.g., the first object mixture model component adapted from the ith universal mixture model component is properly compared with the corresponding second object mixture model component adapted from the ith universal mixture model component. If there are N mixture components in the universal model, then the comparison of the first and second objects entails N component comparisons. In contrast, for approaches in which the object model is not derived by adaptation of a universal mixture model, there is no a priori known component-by-component correspondence, and the comparison entails pairwise comparison of each possible set of first and second object model components, i.e. $N^2$ component comparisons. Thus, the object comparison approaches disclosed herein are computationally fast relative to at least some other approaches.

With reference to FIG. 1, an illustrative object retrieval and classification apparatus includes a processing device 10, such as illustrated computer, an Internet server, mainframe computer, supercomputer, or so forth, communicating with at least one digital storage medium 12 such as a hard disk (which in some embodiments may be internal to the computer or other processing device 10), Internet server, RAID disk system, FLASH or other electrostatic memory, optical disk, random access memory (RAM), read-only memory (ROM), or so forth, or some combination of such digital storage media. The processing device 10 includes at least one output device, such as an LCD, plasma, cathode ray tube, or other display 14, a printer or other marking engine, or so forth, and further includes at least one input device, such as a keyboard 16, mouse, trackball, trackpad 17, or so forth. In some embodiments, one, some, or all of the input and/or output devices may be connected by a cable, digital network (e.g., Ethernet or WiFi), or wirelessly (e.g., by a Bluetooth connection) with the processing device. The digital storage device 12 stores a reference objects database 20, optional universal mixture model training software 22, a universal mixture model 24 generated by execution of the optional universal mixture model training software 22 or otherwise generated or made available, and application software such as similar objects retrieval software 26, object classification software 27, or so forth.

In operation, an input object 30, such as an input image, is received by the processing device 10. The input object 30 may be received from various places, such as retrieved from the digital storage medium 12, retrieved from a network 32, read from an optical disk reader 34 (the reader 34 is optionally built into the processing device 10 or is optionally a remote or separate unit connected wirelessly or by wired connection with the processing device 10). The input object 30 is processed by execution of the similar objects retrieval software 26 on the processing device 10 to find objects in the objects database 20 that are similar to the input object 30. Additionally or alternatively, the input object 30 is processed by execution of the object classification software 27 on the processing device 10 to classify the input object 30 based on its similarity to objects in the objects database 20 that are annotated with classification labels. The choice of software used to process the input object 30 is suitably made by a user selection via one or more of the input devices 16, 17, or based on other decision criteria.

With continuing reference to FIG. 1, an illustrative approach suitably implemented by the universal mixture model training software 22 for generating the universal mixture model 24 as a Gaussian mixture model (GMM) is described. The density of low-level features in the training images is estimated and represented by a mixture of Gaussian components that define the universal mixture model 24. In the image retrieval and classification context, the universal mixture model 24 is sometimes referred to as a universal vocabulary of visual terms. The parameters of the Gaussian components of the universal mixture model 24 are determined by clustering the low-level feature vectors extracted from the set of representative training images.

In the following examples, let $X=\{x_t, t=1 \ldots T\}$ denote a set of T feature vectors of dimension D. The illustrative example employs a Gaussian mixture model (GMM) in clustering the set of low-level feature vectors. The parameters of a GMM are denoted $\lambda=\{\omega_i, \mu_i, \Sigma_i, i=1 \ldots N\}$ where $\omega_i$, $\mu_i$ and $\Sigma_i$ are respectively the weight, mean vector and covariance matrix of Gaussian i and N denotes the number of Gaussian components. Let $Q=\{q_t, t=1 \ldots\}$ denote the set of hidden variables associated with the observations X. The likelihood that observation $x_t$ was generated by the GMM is given by:

$$p(x_t | \lambda) = \sum_{i=1}^{N} \omega_i p_i(x_t | \lambda), \qquad (1)$$

where $p_i(x_t|\lambda)=p(x_t|q_t=i,\lambda)$. The weights are subject to the constraint:

$$\sum_{i=1}^{N} \omega_i = 1. \qquad (2)$$

The components $p_i$ are given by:

$$p_i(x_t|\lambda) = \frac{\exp\left\{-\frac{1}{2}(x_t-\mu_i)'\Sigma_i^{-1}(x_t-\mu_i)\right\}}{(2\pi)^{D/2}|\Sigma_i|^{1/2}}, \quad (3)$$

where |.| denotes the determinant operator. In this example it is assumed that the covariance matrices are diagonal as (i) any distribution can be approximated with an arbitrary precision by a weighted sum of Gaussians with diagonal covariances and (ii) the computational cost of diagonal covariances is much lower than the cost involved by full covariances. The notation $\sigma_i^2=\text{diag}(\Sigma_i)$ is used. The expression log p(X|λ) denotes the likelihood of the samples on the model. Under an independence assumption, the following holds:

$$\log p(X|\lambda) = \sum_{t=1}^{T} \log p(x_t|\lambda). \quad (4)$$

An illustrative example of training such a GMM is as follows. Let $\lambda^u$ denote the parameters of the universal GMM. This GMM models the density of low-level feature vectors in an "average" or "typical" image of the set of training images. Let $X=\{x_t, t=1 \ldots T\}$ denote the set of training samples. The estimation of $\lambda^u$ may be performed by maximizing the log-likelihood function log p(X|$\lambda^u$). This is referred to as Maximum Likelihood Estimation (MLE). A suitable procedure for MLE is the Expectation Maximization (EM) algorithm, described for example in Dempster et al., "Maximum likelihood from incomplete data via the EM algorithm", *Journal of the Royal Statistical Society* (1977), which is incorporated herein by reference in its entirety. The EM algorithm alternates two steps: (1) an expectation (E) step in which the posterior probabilities of mixture occupancy (also referred to as occupancy probabilities) are computed based on the current estimates of the parameters; and (2) a maximization (M) step in which the parameters are updated based on the expected complete data log-likelihood which depends on the occupancy probabilities computed in the E-step. For the E-step, let $\gamma_t(i)$ denote the occupancy probability, that is, the probability for observation $x_t$ to have been generated by the i-th Gaussian. It can be computed using Bayes formula:

$$\gamma_t(i) = p(q_t = i | x_t, \lambda^u) = \frac{\omega_i^u p_i(x_t | \lambda^u)}{\sum_{j=1}^{N} \omega_j^u p_j(x_t | \lambda^u)}. \quad (5)$$

The M-step re-estimation equations are suitably written as:

$$\hat{\omega}_i^u = \frac{1}{T}\sum_{t=1}^{T}\gamma_t(i), \quad (6)$$

$$\hat{\mu}_i^u = \frac{\sum_{t=1}^{T}\gamma_t(i)x_t}{\sum_{t=1}^{T}\gamma_t(i)}, \text{ and} \quad (7)$$

$$(\hat{\sigma}_i^u)^2 = \frac{\sum_{t=1}^{T}\gamma_t(i)x_t^2}{\sum_{t=2}^{T}\gamma_t(i)} - (\hat{\mu}_i^u)^2, \quad (8)$$

where the notation $x^2$ is used as a shorthand for diag(xx').

The foregoing construction of a GMM-based example for the universal mixture model is illustrative. Some other examples of construction and training of GMM models is given in Perronnin, U.S. Publ. Appl. 2007/0005356 A1 which is incorporated herein by reference in its entirety.

Figure 2:
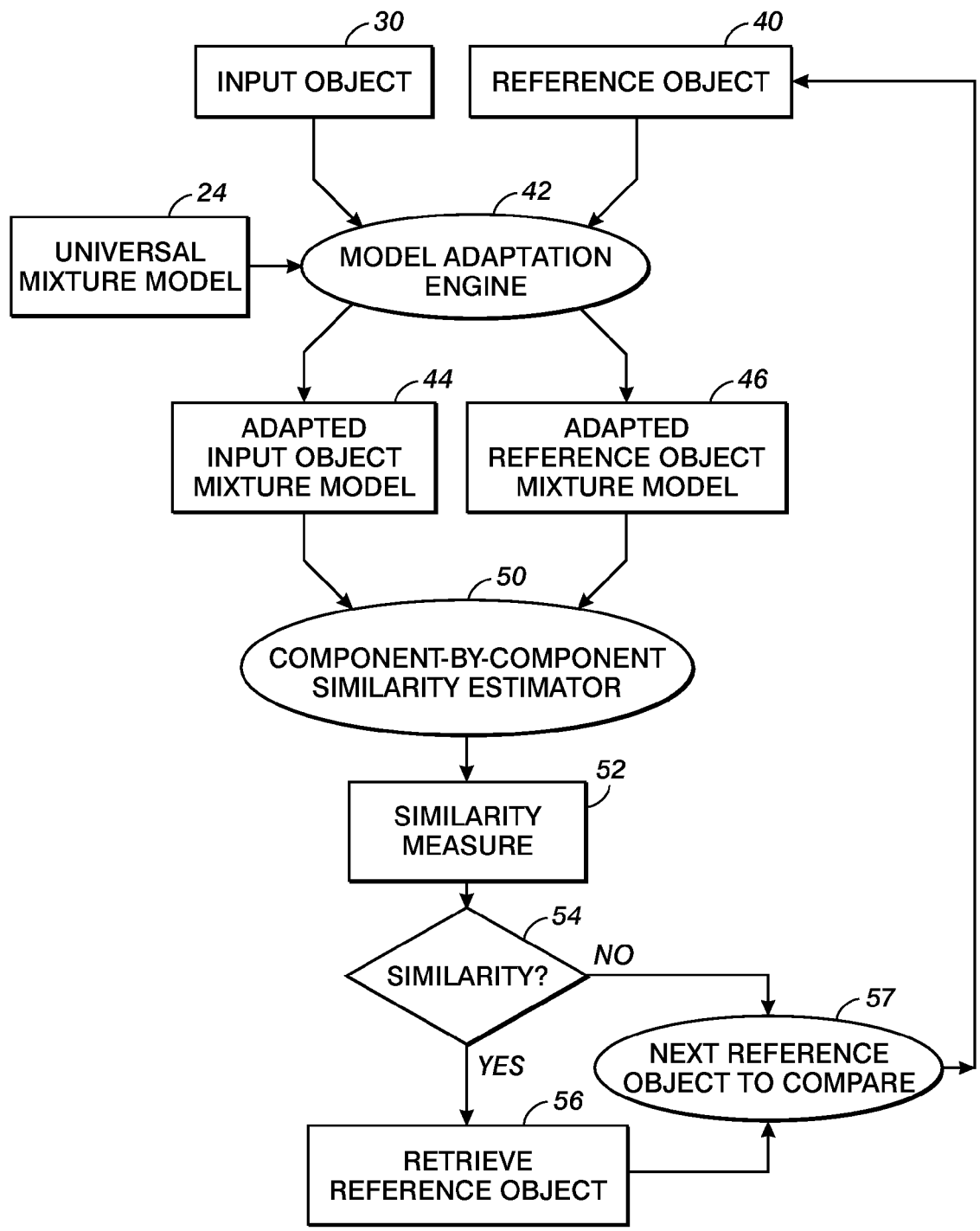
FIG. 2 diagrammatically shows a similar object retrieval method suitably performed by the apparatus of FIG. 1.

With reference to FIG. 2, an illustrative method performed by execution of the similar objects retrieval software 26 is described. The method compares the input object 30 with a reference object 40 stored in the reference objects database 20, and makes use of the universal mixture model 24. In the illustrative examples which follow, the objects are taken to be images, although as noted previously other types of objects can be retrieved and/or classified using the disclosed approaches. When the number of samples available to estimate a density is scarce (in the case of image objects, for example, in some embodiments there may be a few hundreds of feature vectors for each image, although fewer or more feature vectors per image is also contemplated), adaptation provides a more robust estimate compared to the case where the density is trained independently for each image. Adaptation is also beneficial as there is a direct correspondence between the components of different adapted models. As is shown herein, this property may be used for efficient computation of a similarity between image densities.

An image is described by the density of its low-level features. The density estimate of an image is obtained herein by applying a model adaptation engine 42 to adapt the universal mixture model 24 to the set of low-level feature vectors extracted from the image. In the comparison operation shown in FIG. 2, the model adaptation engine 42 is applied to the input image 30 to generate a corresponding adapted input object model 44, and is separately applied to the reference object 40 to generate a corresponding adapted reference object model 46. A suitable adaptation process is described in the following.

The image to which the universal mixture model 24 is to be adapted is described by the density of its low-level feature vectors. The estimate is suitably obtained through adaptation of the universal mixture model 24. Let $X=\{x_t, t=1 \ldots \}$ here denote the set of adaptation samples extracted from the image. In the following, $\lambda^a$ denotes the parameters of an adapted mixture model. In the following, the adaptation is performed using the Maximum a Posteriori (MAP) method. The goal of MAP estimation is to maximize the posterior probability p($\lambda^a$|X) or equivalently log p(X|$\lambda^a$)+log p($\lambda^a$). A difference in the MAP method as compared with the MLE method used in the illustrative universal mixture model training lies in the use in the case of MAP of an appropriate prior distribution of the parameters to be estimated. Therefore, it remains to (i) choose the prior distribution family and (ii) specify the parameters of the prior distribution.

The MAP adaptation of the GMM is a well-studied problem in the field of speech and speaker recognition. See, for example: Gauvain et al., "Maximum a posteriori estimation for multivariate Gaussian mixture observations of Markov chains", *IEEE trans. On speech and Audio Processing*, (1994); and Reynolds et al., "Speaker verification using adapted Gaussian mixture models", *Digital Signal Processing*, (2000), both of which are incorporated herein by reference in their entireties. For both applications, one is interested in adapting a universal model, which reasonably describes the speech of any person, to more specific conditions using the data of a particular person. It was shown in Gauvain et al. that the prior densities for GMM parameters could be adequately represented as a product of Dirichlet (prior on weight parameters) and normal-Wishart densities (prior on Gaussian parameters). When adapting a universal model with MAP to more specific conditions, it is appropriate to use the parameters of the universal model as a priori information on the location of the adapted parameters in the parameter space. As shown in Gauvain et al., one can also apply the EM procedure to MAP estimation. During the E-step, the occupancy probabilities $\gamma_t(i)$ are computed as was the case for MLE:

$$\gamma_t(i) = p(q_t = i | x_t, \lambda^a) \quad (9).$$

The M-step re-estimation equations are suitably written as:

$$\hat{\omega}_i^a = \frac{\sum_{t=1}^{T} \gamma_t(i) + \tau}{T + \sum_{i=1}^{N} \tau}, \quad (10)$$

$$\hat{\mu}_i^a = \frac{\sum_{t=1}^{T} \gamma_t(i) x_t + \tau \mu_i^u}{\sum_{t=1}^{T} \gamma_t(i) + \tau}, \text{ and} \quad (11)$$

$$(\hat{\sigma}_i^a)^2 = \frac{\sum_{t=1}^{T} \gamma_t(i) x_t^2 + \tau[(\sigma_i^u)^2 + (\mu_i^u)^2]}{\sum_{t=1}^{T} \gamma_t(i) + \tau} - (\hat{\mu}_i^a)^2, \quad (12)$$

where $\tau$ is a relevance factor which in some embodiments is set to $\tau=10.0$, although other values can be used. The parameter $\tau$ keeps a balance between the a priori information contained in the universal mixture model 24 and the new evidence brought by the image-specific data. If a mixture component i was estimated with a small number of observations $\sum_{t=1}^{T} \gamma_t(i)$, then more emphasis is put on the a priori information. On the other hand, if it was estimated with a large number of observations, more emphasis will be put on the new evidence. Hence the MAP adaptation technique provides a more robust estimate than MLE when little training data is available. Other illustrative adaptation examples are set forth in Perronnin, U.S. Publ. Appl. 2007/0005356 A1 which is incorporated herein by reference in its entirety.

With continuing reference to FIG. 2, once the adapted input object mixture model 44 and the adapted reference object mixture model 46 are produced by adaptation of the universal mixture model 24, the two models 44, 46 are suitably compared by a component-by-component similarity estimator 50 to assess similarity of the two images 30, 40. In the following, the object mixture model 44 is denoted $$p(x) = \sum_{i}^{I} \alpha_i p_i(x)$$

where the index i runs over the I components of the mixture model. Similarly, the reference mixture model 46 is denoted $$q(x) = \sum_{j}^{J} \beta_j q_j(x)$$

where j runs over the J components of the mixture. Ordinarily, the comparison would entail comparing each of the i elements of the object mixture model 44 with each of the j elements of the reference mixture model 46, which would involve I×J comparisons. However, because in the two mixture models 44, 46 were both derived from the same universal mixture model 24 having N components, it follows that I=J=N, so that $$p(x) = \sum_{i}^{N} \alpha_i p_i(x)$$

and $$q(x) = \sum_{j}^{N} \beta_j q_j(x).$$

Furthermore, it is known a priori that components $p_i(x)$ and $q_j(x)$ correspond if and only if i=j. Accordingly, the I×J comparisons are reduced to N comparisons. The foregoing is a consequence of the generation of the input and reference object mixture models 44, 46 by adaptation of the universal mixture model 24.

The component-by-component similarity estimator 50 can perform the component-by-component comparison using various similarity measurement algorithms. In the following, it is shown that either the probability product kernel similarity measure or the Kullback-Leibler kernel similarity measure can be implemented at least in approximation while taking advantage of the previously described computational advantage provided by the a priori known component correspondences inherent in mixture models 44, 46 generated by adaptation of the same universal mixture model 24.

Some probability product kernel approaches are considered first. The Probability Product Kernel (PPK) between distributions p and q is defined as follows:

$$K_{ppk}^{\rho}(p,q) = \int_x p(x)^{\rho} q(x)^{\rho} dx \quad (13).$$

When $\rho=1$, the PPK takes the form of the expectation of one distribution under the other and is referred to as the Expected Likelihood Kernel (ELK):

$$K_{elk}(p,q) = \int_x p(x) q(x) dx = E_p[q(x)] = E_q[p(x)] \quad (14).$$

For $\rho=\frac{1}{2}$, the kernel becomes the Bhattacharyya Kernel:

$$K_{bha}(p,q) = \int_x \sqrt{p(x)} \sqrt{q(x)} dx \quad (15).$$

Note that $K_{bha}(p,p)=1$. There is a closed form expression for the PPK between two Gaussians for an arbitrary $\rho$:

$$K_{ppk}^{\rho}(p, q) = (2\pi)^{(1-2\rho)D/2} |\Sigma|^{1/2} |\Sigma_p|^{-\rho/2} \quad (16)$$

$$|\Sigma_q|^{-\rho/2} \exp\left(-\frac{\rho}{2} \mu_p^T \Sigma_p^{-1} \mu_p - \frac{\rho}{2} \mu_q^T \Sigma_q^{-1} \mu_q + \frac{1}{2} \mu^T \Sigma \mu\right),$$

where $\Sigma = (\rho \Sigma_p^{-1} + \rho \Sigma_q^{-1})^{-1}$ and $\mu = \rho \Sigma_p^{-1} \mu_p + \rho \Sigma_q^{-1} \mu_q$. However there is no closed form expression for the PPK in the case of GMMs (except for the case ρ=1). In Jebara et al., "Bhattacharyya and expected likelihood kernels", *Proc. of the 16th annual conference on learning theory and seventh kernel workshop*, 2003), which is incorporated herein by reference in its entirety, the following approximation is suggested:

$$K_{ppk}^{\rho}(p, q) \approx \sum_{i}^{I}\sum_{j}^{J} \alpha_i \beta_j K_{ppk}^{\rho}(p_i, q_i). \quad (17)$$

The two GMMs contain respectively I and J Gaussian components, and so evaluation of Equation (17) entails computation of I×J PPK between individual Gaussian components. This cost may be problematic or even prohibitive in the case of large values of I and J. As discussed previously, however, because the two mixture models 44, 46 are adapted from the same universal mixture model 24 having N components, the double-summation over I and J is reducible to a single summation over the N components known a priori to correspond. That is, because the i-th Gaussian of the input object mixture model 44 and the i-th Gaussian of the reference object mixture model 46 are adapted from the same i-th Gaussian of the universal mixture model 24, there is expected to be a strong correspondence between them. On the other hand, there is expected to be little or no correspondence between the i-th Gaussian of the input object mixture model 44 and the j-th Gaussian of the reference object mixture model 46, where i≠j, because these two Gaussian components are derived from different Gaussian components of the universal mixture model 24. Accordingly, terms $K_{ppk}^{\rho}(p_i,q_i)$ dominate the double summation of Equation (17), and terms for which i≠j can be neglected. Hence, for the case of mixture models 44, 46 both adapted from the same universal mixture model 24 having N components, the PPK may be further approximated as follows:

$$K_{ppk}^{\rho}(p, q) \approx \sum_{i=1}^{N} \alpha_i \beta_i K_{ppk}^{\rho}(p_i, q_i). \quad (18)$$

Evaluation of Equation (18) entails computation of only N Gaussian component comparisons, which represents a substantial computational saving as compared with Equation (17) which entails $N^2$ computations for I=J=N. The approximation also improves significantly the performance, because the corresponding Gaussian components that should be compared are known a priori.

As a second illustrative example, some Kullback-Leibler kernel approaches are next considered. The Kullback-Leibler divergence KL(p∥q) is defined as:

$$KL(p\|q) = \int_x p(x)\log\left(\frac{p(x)}{q(x)}\right)dx. \quad (19)$$

There is a closed form expression for the KL divergence between two Gaussian components:

$$KL(p\|q) = \frac{1}{2}\left(\log\frac{|\Sigma_q|}{|\Sigma_p|} + Tr(\Sigma_q^{-1}\Sigma_p) + (\mu_q - \mu_p)^T \Sigma_q^{-1}(\mu_p - \mu_q) - D\right). \quad (20)$$

However, there is no closed-form expression for the KL divergence between two GMMs. Various approximations have been proposed. In the following, an approach set forth in Goldberger et al., "An Efficient Image Similarity Measure based on Approximations of KL-Divergence Between Two Gaussian Mixtures", *International Conference on Computer Vision (ICCV*2003), which is incorporated herein by reference in its entirety, is followed. This approximation first consists in finding a mapping π from the Gaussians of p to the Gaussians of q as follows:

$$\pi(i)=\arg\min_j(KL(p_i\|q_j)-\log\beta_j \quad (21),$$

and to use π to approximate the KL divergence as follows:

$$KL(p\|q) \approx \sum_{i=1}^{N} \alpha_i\left(KL(p_i\|q_{\pi(i)}) + \log\frac{\alpha_i}{\beta_{\pi(i)}}\right). \quad (22)$$

If two GMMs contain respectively I and J Gaussians, computing the mapping function π entails computation of I×J KL divergences between individual Gaussians, which may be problematic or prohibitive. However, the generation of the mixture models 44, 46 by adaptation of the same N component universal model 24 can be utilized to reduce this computation to N KL divergences. Because the mixture models 44, 46 are adapted from the same universal mixture model 24, there is expected to be a strong correspondence between the i-th Gaussian components of two mixture models 44, 46. Hence, we assume that π(i)=i and accordingly approximate the KL divergence as:

$$KL(p\|q) \approx \sum_{i=1}^{N} \alpha_i\left(KL(p_i\|q_i) + \log\frac{\alpha_i}{\beta_i}\right). \quad (23)$$

Hence, the computation of the KL divergence requires only N Gaussian computations in Equation (23). The symmetric KL divergence is defined as KL(p,q)=KL(p∥q)+KL(q∥p) and the KL kernel (KLK) is defined as follows:

$$K_{klk}(p,q)=\exp(-aKL(p,q)+b) \quad (24).$$

Where a and b are constants.

With continuing reference to FIG. 2, the component-by-component similarity estimator 50 generates a similarity measure 52, for example using the Probability Product Kernel (PPK) of Equation (18), or the Kullback-Leibler divergence of Equation (23), both of which operate by component-by-component similarity comparison of the N corresponding Gaussian components. At a decision block 54, the similarity measure 52 is compared with a similarity criterion, such as a threshold value or the like. If the similarity criterion is satisfied by the similarity measure 52, then the reference object 40 is retrieved 56 as it is identified as an object similar to the input object 30. If the similar objects retrieval software 26 is operating to retrieve all (or a selected plural number of) similar objects from the reference objects database 20, then a next reference object to compare is identified 57 and serves as the next reference object 40 for comparison.

To achieve further efficiency, two additional computational aspects are noted. First, if the same input object 30 is to be compared with a plurality of different reference objects, as for example in the case of a search of the objects database 20, then the input object 30 is suitably only processed once by the model adaptation engine 42 to generate the adapted input object mixture model 44. Thereafter, the same adapted input object mixture model 44 can be compared with the adapted reference object mixture model 46 generated for each successive reference object selected for comparison. Additionally, in some embodiments it is contemplated for the reference object mixture model 46 to be generated by the model adaptation engine 42 for each reference object at the time it is added to the reference objects database 20, and the thusly generated reference object mixture model stored with the reference object in the database 20. In such a case, when the input object 30 is received for comparison it is processed by the model adaptation engine 42 to generate the adapted input object mixture model 44. Thereafter, each reference object comparison entails retrieving the pre-generated adapted reference object mixture model 46 from the database 20 and applying the similarity estimator 50 and decision block 54. This approach can speed computation for implementations in which the same reference object is likely to be compared with more than one input object.

The various computational components 42, 50, 54 that implement the similar objects retrieval method can be variously embodied. In the illustrated embodiment, the computational components 42, 50, 54 are embodied as execution of the similar objects retrieval software 26 by the processing device 10. Additionally or alternatively, one, some, or all of the computational components 42, 50, 54 may be implemented as application-specific integrated circuitry (ASIC), or some combination thereof. The objects retrieved 56 can be displayed on the display 14, stored in a suitable data structure, directory, or the like on the storage medium 12, retained in the database 20 and annotated as similar, communicated over the network 32, or so forth.

Figure 3:
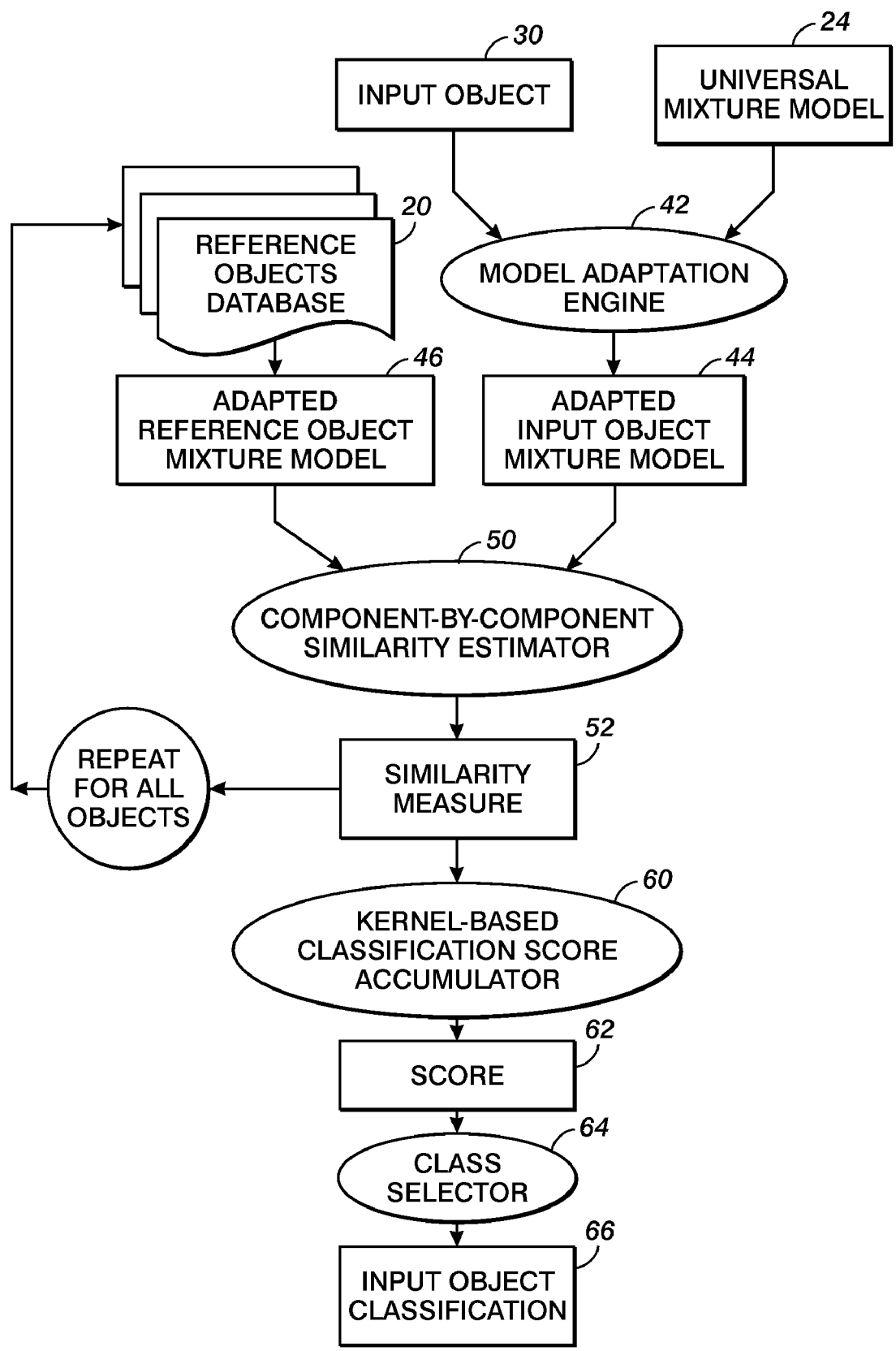
FIG. 3 diagrammatically shows an object classification method suitably performed by the apparatus of FIG. 1.

With reference to FIG. 3, an illustrative method performed by execution of the object classification software 27 is described. The method compares the input object 30 with reference objects 40 stored in the reference objects database 20, and in doing so employs the same model adaptation engine 42 and component-by-component similarity estimator 50 as is used by the similar objects retrieval software 26. (Indeed, in implementations that include both software components 26, 27, it may be advantageous to implement the model adaptation engine 42 and component-by-component similarity estimator 50 as software subroutines, library functions, or other modular software components that are invoked or called by the software components 26, 27.) In the classification approach shown in FIG. 3, it is assumed that the adapted reference object mixture models are generated and stored in the reference objects database 20; accordingly, for each reference object to be compared, the corresponding adapted reference object mixture model 46 is retrieved from the database 20. For the first comparison, the input object 30 is processed by the model adaptation engine 42 to generate the adapted input object mixture model 44, which again is used thereafter for all comparisons. As in the case of the similar objects retrieval, the component-by-component similarity estimator 50 performs a component-by-component comparison to generate the similarity measure 52, for example by implementing the Probability Product Kernel (PPK) of Equation (18), or the Kullback-Leibler divergence of Equation (23), both of which operate by component-by-component similarity comparison of the N corresponding Gaussian components.

For the purpose of classification, each reference object has at least one class annotation. In some embodiments, each reference object has precisely one class annotation, such that each reference object is unambiguously assigned to a single class. In other embodiments, each reference object may have more than one class annotation—for example, an image of a dog running along a beach might be assigned 40% membership in a "landscapes" class and 60% membership in a "dogs" class. A kernel-based classification score accumulator 60 generates a score 62 based on comparisons of the input image 30 with a set of images having different classification annotations. The score is constructed from the similarity measures 52 of the input image 30 with the variously annotated reference images, with the kernel-based classification score accumulator 60 constructing the score 62 such that it is indicative of which class contains images that are, on average or otherwise statistically, most similar to the input image 30. Based on the score 62, a class selector 64 selects and assigns a class 66 to the input image 30. The assigned class 66 may be unambiguous in the case of a hard classification, or may be ambiguous in the case of a soft classification. As an example of the latter, an input image showing a man holding a dog may be assigned 50% to a "portraits" class and 50% to the aforementioned "dogs" class. The class 66 can be displayed on the display 14, annotated to the input image 30 and stored with the input image 30 in the storage medium 12, added to the database 20 and annotated with the class 66, communicated over the network 32 with or without the accompanying input image 30, or so forth.

As an illustrative example, consider L reference images denoted as $\{(x_i, y_i), i=1 \ldots L\}$, where $x_i$ denotes the adapted reference image model and $y_i$ denotes the classification label where a hard binary classification is used for simplicity (i.e., $y_i = +1$ indicates the image belongs to one class, or $y_i = -1$ indicates the image belongs to the other class, with only two classes available in this illustrative example. Then the score 62 is suitably computed as:

$$S(x) = \sum_{i=1}^{L} \alpha_i \cdot y_i \cdot K(x, x_i) + b, \qquad (25)$$

where $K(x, x_i)$ is the similarity measure between the input image denoted as x and the reference image denoted as $x_i$. More generally, substantially any weighted combination of distances to positive and negative training samples can be used, wherein the distances are the similarity measures or are derived from the similarity measures and the "positive" or "negative" aspect of the training samples denotes how closely a given reference image positively or negatively matches a class under consideration. Moreover, other classification approaches can be used to quantitatively assess how closely the input image matches images belonging to a class under consideration and how far the input image deviates from images not belonging to the class under consideration, the match closeness or deviation being quantified based on the computed similarity measures 52.

In the illustrative examples set forth herein, the model adaptation engine 42 employs the MAP criterion to perform the model adaptation. However, other adaptation techniques are also contemplated for use, such as the maximum likelihood linear regression (MLLR) (Leggetter et al., "Maximum likelihood linear regression for speaker adaptation of continuous density hidden Markov models", *Computer Speech and Language,* 1995, vol. 9, pp. 171-185, which is incorporated herein by reference in its entirety) or cluster adaptive training (CAT) (Gales, "Cluster adaptive training for speech recognition", *International Conference on Spoken Language Processing (ICSLP),* 1998, pp. 1783-1786, which is incorporated herein by reference in its entirety). The MLLR and CAT approaches advantageously can use relatively few adaptation vectors.

Similarly, while the illustrative examples set forth herein employ the probabilistic GMM as the mixture model, other probabilistic and non-probabilistic mixture models are also contemplated for use. For example, the universal mixture model could be a set of vectors obtained through K-means clustering, and the adaptation performed as follows. The model of an image would be a set of vectors obtained through K-means clustering of the low-level feature vectors of that image, the centroids used at the initialization stage being those of the universal model. Accordingly, the universal mixture model and the adapted mixture models have the desired component-by-component correspondence.

A working example of the disclosed classification techniques has been constructed and applied to classification of images as follows. The working example made use of two types of low-level features: grey-level features and color features. The dimensionality of these feature vectors was reduced using principal component analysis (PCA). To train the universal GMM, use was made of an iterative strategy. A GMM with only one Gaussian was first trained, which can be done using a closed form solution. The trained single Gaussian was then split into two, and the split Gaussian components were retrained using EM. The process of splitting and retraining was repeated until the desired number of components for the Gaussian mixture was obtained. For the adaptation of the per-image models, $\tau=10$ was used. For the probability product kernel (PPK) similarity measure, best results were obtained with $\rho=0.5$. Both PPK and KL similarity measures were applied; however, as the PPK always outperformed the KL based kernels in the applied working examples, only results for the PPK are described herein. For classification, kernel logistic regression (KLR) was used.

The PASCAL VOC 2007 database was used, consisting of 20 object categories: person, bird, cat, cow, dog, horse, sheep, aeroplane, bicycle, boat, bus, car, motorbike, train, bottle, chair, dining table, potted plant, sofa and TV monitor. The working examples used 2,501 images from this database for training of the universal mixture model, and a different 2,511 images for testing (that is, to assess the performance). Two sets of classifications were carried out. In the first set of classifications the universal GMM was estimated with the 2,501 training images of the VOC 2007 database. In the second set of experiments, an independent set of approximately 2,000 images were used to verify that the method was robust with respect to the universal mixture model. The measure of performance used was the average precision (AP), and the mean over the 20 categories is reported herein.

Additionally, for comparison classification was done using Fisher kernels, and by a method entailing estimating the input image GMM without adaptation. In this comparison technique the MAP criterion was not used, and instead the MLE criterion was used to generate the GMM for the input image. Hence, this latter comparative method is referred to herein as GMM-MLE. The PPK was used to compute the distance between two GMMs.

In Table 1 the following information is reported for each of the three methods 1) the number of Gaussians which led to the best performance, 2) the mean AP and 3) the approximate time it takes to classify one image. It can be seen in Table 1 that the approach disclosed herein employing adaptation via the MAP method and component-by-component comparison based on a priori known component correspondences provides a significant increase of the performance with respect to comparative Fisher kernel and GMM-MLE approaches. The computational cost is higher than the Fisher kernel approach, but is substantially lower than the GMM-MLE approach.

It was also desired to evaluate the robustness of the approaches disclosed herein with respect to the learned universal mixture model. Therefore, a universal model was learned using approximately 2,000 independent images sampled randomly from a set of 120,000 images. The performance decreased from 0.514 down to 0.501.

TABLE 1

|  | Fisher kernels | GMM-MLE | Method disclosed herein |
|---|---|---|---|
| number of Gaussians | 128 | 32 | 128 |
| mean average precision (AP) | 0.463 | 0.453 | 0.514 |
| classification time | 200 msec | 20 sec | 2 sec |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An object processing method comprising:
adapting a universal mixture model including a plurality of universal mixture model components to a first object to generate a first object mixture model including a plurality of first object mixture model components having one-to-one correspondence with the plurality of universal mixture model components;
performing component-by-component comparison of the plurality of first object mixture model components and a plurality of second object mixture model components obtained by adaptation of the universal mixture model to a second object and having one-to-one correspondence with the plurality of first object mixture model components; and
generating a similarity measure for the first and second objects based on the component-by-component comparison;
wherein the adapting, performing, and generating operations are performed by a processing device.

2. The method as set forth in claim 1, further comprising:
adapting the universal mixture model including the plurality of universal mixture model components to the second object to generate a second object mixture model including the plurality of second object mixture model components.

3. The method as set forth in claim 1, further comprising:
displaying the second object as a similar object conditional upon the similarity measure satisfying a similarity criterion.

4. The method as set forth in claim 1, further comprising:
repeating the performing of component-by-component comparison and the generating for objects of a database of second objects; and
retrieving objects of the database of second objects to generate a set of objects similar to the first object, each retrieving operation being conditional upon the similarity measure corresponding to the reference object satisfying a similarity criterion.

5. The method as set forth in claim 1, further comprising:
repeating the performing of component-by-component comparison and the generating of the similarity measure for objects of a database of second objects each of which have at least one class annotation;
combining the similarity measures computed for the objects of the database of second objects to compute a score; and
classifying the first object based on the computed score.

6. The method as set forth in claim 1, wherein the universal mixture model is a Gaussian mixture model and the universal, first object, and second object mixture model components are Gaussian distributions.

7. The method as set forth in claim 1, wherein the universal, first object, and second object mixture model components are probabilistic or statistical distributions.

8. The method as set forth in claim 1, wherein the universal mixture model is a non-probabilistic mixture model and the universal, first object, and second object mixture model components are vectors obtained using K-means clustering.

9. The method as set forth in claim 8, wherein the adapting comprises:
clustering feature vectors representative of the first object using K-means, wherein the universal mixture model components are used as initial values for the corresponding first object mixture model components.

10. The method as set forth in claim 1, further comprising:
determining the plurality of universal mixture model components by training the universal mixture model respective to a training set of representative objects using a maximum likelihood training process.

11. The method as set forth in claim 1, wherein the adapting employs an adaptation process selected from the group consisting of (i) a maximum a posteriori (MAP) adaptation process, (ii) a maximum likelihood linear regression (MLLR) adaptation process, and (iii) a cluster adaptive training (CAT) adaptation process.

12. The method as set forth in claim 1, wherein the adapting employs an iterative adaptation process using the plurality of universal mixture model components as initial values for the corresponding plurality of first object mixture model components.

13. The method as set forth in claim 1, wherein the performing of component-by-component comparison and the generating of a similarity measure yields a similarity measure that at least approximates a probability product kernel.

14. The method as set forth in claim 1, wherein the performing of component-by-component comparison and the generating of a similarity measure yields a similarity measure that at least approximates a Kullback-Leibler divergence.

15. The method as set forth in claim 1, wherein the plurality of universal mixture model components consist of N universal mixture model components, and the performing of component-by-component comparison essentially consists of:
performing N comparisons.

16. The method as set forth in claim 1, wherein the first object is a first image and the second object is a second image.

17. A digital storage medium storing digital instructions executable to perform a method comprising:
adapting N universal mixture model components to a first object to generate N corresponding first object mixture model components, where N is an integer greater than or equal to two; and
generating a similarity measure based on component-by-component comparison of the N first object mixture model components with corresponding N second object mixture model components obtained by adaptation of the N universal mixture model components to a second object.

18. The digital storage medium as set forth in claim 17, wherein the method further comprises:
adapting the N universal mixture model components to the second object to generate the N second object mixture model components.

19. The digital storage medium as set forth in claim 17, wherein the method further comprises:
retrieving the second object conditional upon the similarity measure satisfying a similarity criterion.

20. The digital storage medium as set forth in claim 17, wherein the method further comprises:
repeating the generating for objects of a database of second objects; and
classifying the first object based on the generated similarity measures and class annotations associated with the objects of the database of second objects.

21. The digital storage medium as set forth in claim 17, wherein the universal, first object, and second object mixture model components are Gaussian distributions.

22. The digital storage medium as set forth in claim 17, wherein the similarity measure is at least an approximation of one of (i) a probability product kernel and (ii) a Kullback-Leibler divergence.

23. An object processing apparatus comprising:
a model adaptation engine configured to adapt a plurality of universal mixture model components to a first object to generate a corresponding plurality of first object mixture model components; and
a component-by-component similarity estimator configured to generate a similarity measure quantifying similarity of the first object and a second object based on component-by-component comparison of the plurality of first object mixture model components and a plurality of second object mixture model components obtained by adaptation of the universal mixture model components to the second object.

24. The object processing apparatus as set forth in claim 23, further comprising:
a similar objects retriever configured to retrieve a second object conditional upon the similarity measure quantifying similarity of the first object and the second object satisfying a similarity criterion.

25. The object processing apparatus as set forth in claim 23, further comprising:
object classification software configured to classify the first object based on comparison by the component-by-component similarity estimator of the first object with a plurality of class-annotated second objects.

* * * * *